March 18, 1930.                C. B. O'NEILL                1,751,016
                           WATER LEVEL INDICATOR
                            Filed Dec. 11, 1928          2 Sheets-Sheet 2
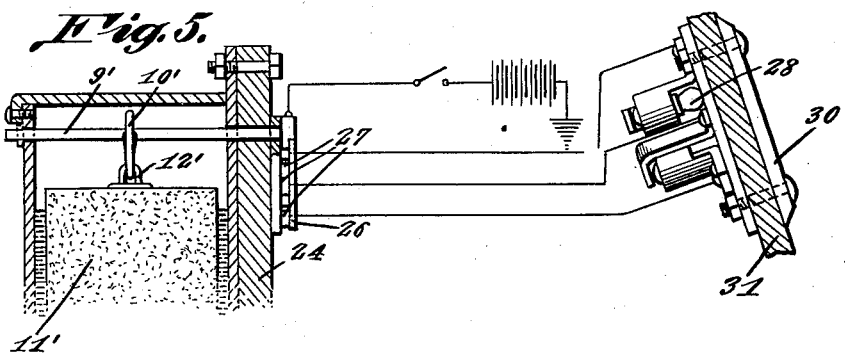
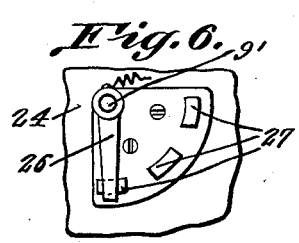
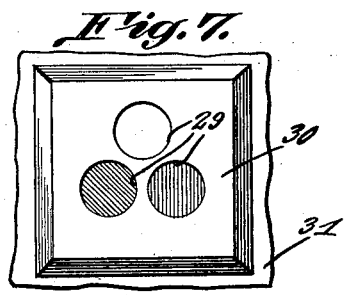
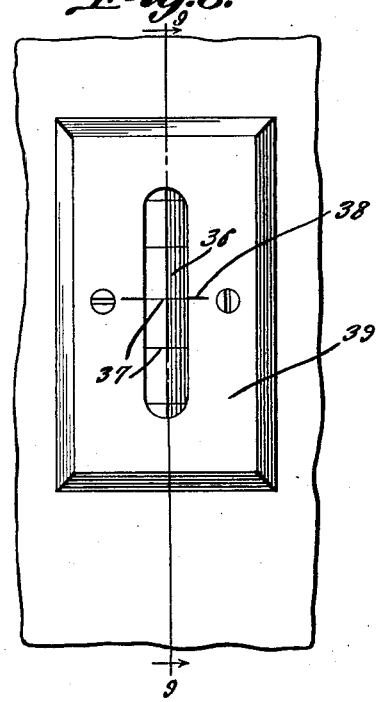
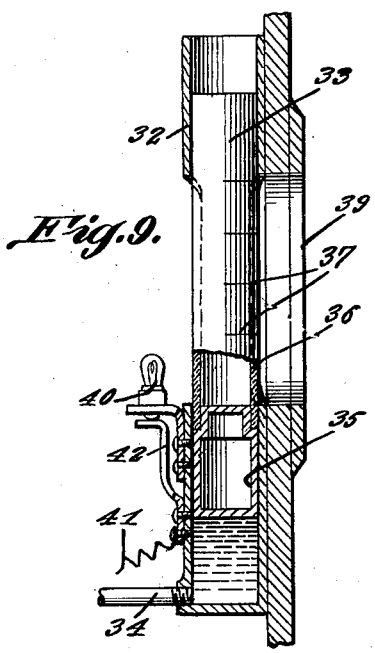
C. B. O'Neill Inventor
By C. A. Snow & Co.
Attorneys.

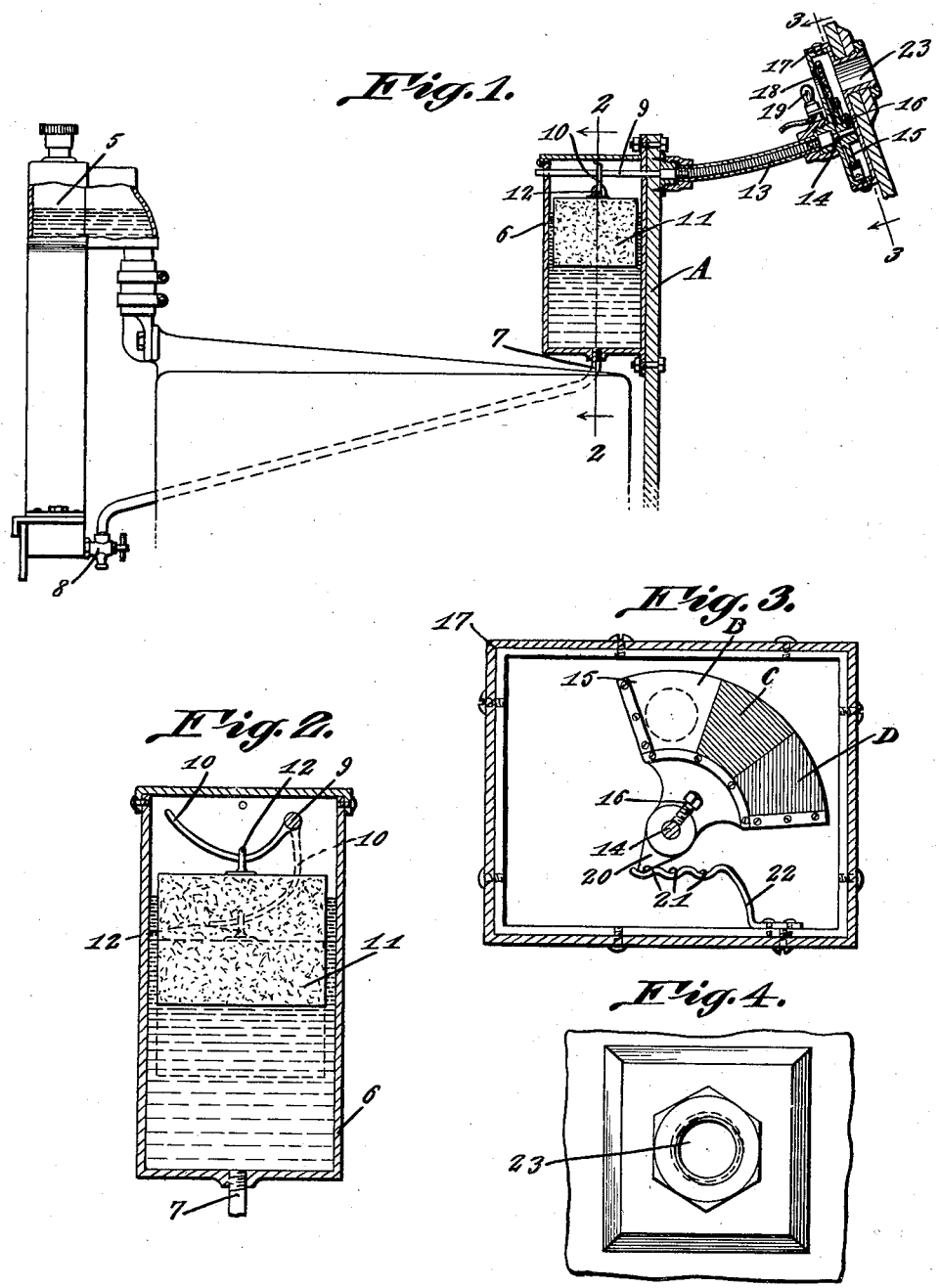

Patented Mar. 18, 1930

1,751,016

UNITED STATES PATENT OFFICE

CLARENCE B. O'NEILL, OF CLYMER, PENNSYLVANIA

WATER-LEVEL INDICATOR

Application filed December 11, 1928. Serial No. 325,261.

This invention relates to internal combustion engines, and more particularly to internal combustion engines forming a part of motor vehicles.

The primary object of the invention is to provide means for indicating the water level in the water system of an internal combustion engine, so that the operator may determine at a glance when the water in the system reaches a dangerously low level.

Another object of the invention is to provide means for displaying a signal in the form of an electric lamp and indicating means illuminated by the lamp, for indicating the water level in the system.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a sectional view through the indicator illustrating its relation with the radiator of an internal combustion engine.

Figure 2 is a sectional view taken on line 2—2 of Figure 1.

Figure 3 is a sectional view taken on line 3—3 of Figure 1.

Figure 4 is a view of the signaling device positioned on the instrument board of a motor vehicle.

Figure 5 is a fragmental view illustrating a modified form of the invention.

Figure 6 is an elevational view illustrating the switch forming a part of the system as shown by Figure 5.

Figure 7 is a view of the indicating portion secured to the instrument board of the vehicle.

Figure 8 is an elevational view of a further modified form of indicator.

Figure 9 is a sectional view taken on line 9—9 of Figure 8.

Referring to the drawings in detail, the reference character 5 designates the radiator of a motor vehicle which functions in the usual and well known manner to cool the water passing through the motor.

The device forming the essence of the invention embodies a motor tank 6 which is formed with an opening in its bottom to which the pipe 7 is connected, the pipe 7 leading to the bottom of the radiator where it connects therewith in any suitable manner, although in the present showing the pipe 7 is shown as connected with the drain cock 8.

This tank 6 is supported preferably on the dashboard of the vehicle, the same being provided with an opening to receive the shaft 9 that extends through the upper portion of the tank 6. Extending from the shaft 9 is a curved arm 10 that extends downwardly and upwardly, as clearly shown by Figure 2 of the drawings, the arm 10 providing a support for the float 11 which is supplied with an eye 12 through which the arm extends, so that movement of the float will act to move the arm 10 and shaft 9 connected therewith.

As clearly shown by Figure 1 of the drawings, one end of the shaft 9 extends through the dash-board which is indicated at A, where it connects with the flexible shaft 13 which has its opposite end connected with the shaft 14 to which the indicator 15 is secured, as by means of the set screw 16.

This indicator 15 operates in the housing 17 which is formed with an opening 18 disposed directly in front of the lamp 19, so that light rays from the lamp 19 may project through the opening and through the translucent material of which the signal is constructed. As shown more clearly by Figure 3, the indicating member is formed of a plurality of sections of translucent material, the section B being white and arranged in such position that the light rays will project therethrough under normal conditions. The section C is formed preferably of translucent material colored green, while the section D is constructed of translucent material colored red. It is obvious that as the various colored sections of the indicator move in front of the lamp, the operator may determine at a glance the water level in the radiator.

Extending from the indicating member is a finger 20 that moves in the offset portion 21 of the spring arm 22, with the result that as the indicator is moved to its various indicating positions, it will be temporarily held against movement, until the action of the float 11 overcomes the tension of the spring arm to move the indicator. A sight opening is formed in the indicator, and is indicated by the reference character 23, which sight opening is disposed at the instrument board so that it may be easily observed by the operator.

In the form of the invention as illustrated by Figure 5 of the drawings, the dash-board is indicated by the reference character 24, to which the tank 25 is secured, the tank 25 being in communication with the radiator of the internal combustion engine through a pipe as indicated by Figure 1 of the drawings.

The reference character 9' designates a shaft supplied with a curved arm 10' that supports the float 11'', through the eye 12' secured to the float. At one end of the shaft 9' is a switch arm 26 that moves over the contacts 27 that are in circuit with lamps 28 mounted adjacent to the openings 29 formed in the plate 30 that is secured to the instrument board 31 of the vehicle. These openings 29 are covered with a translucent material, the uppermost opening being covered by a white material, while the lower openings are covered with green and red materials respectively, so that as the arm 26 moves over the contacts 27, circuits will be completed to the lamps 28 signaling to the operator the condition of the water in the radiator of the vehicle.

In Figures 8 and 9 of the drawing a further modification is illustrated, and in this form of the invention a vertical tube 32 is employed and is supported on the instrument board, the instrument board being supplied with an opening, so that the tube and movable member 33, may be viewed therethrough. This tube 32 is in communication with the lowermost point of the radiator through the pipe 34, and it is obvious that as water is placed in the radiator water will pass through the pipe 34 and into tube 32, seeking its level in tube 32.

The movable member 33 includes a float 35 and a glass tube 36 which is provided with graduations 37 adapted to register with a line 38 formed on the plate 39 that fits over the opening of the instrument board.

At the rear of the tubular member 32 is an electric lamp 40 in circuit with a suitable switch and source of electric supply, through the wire 41 and contact arm 42, so that the light rays from the lamp 40 will illuminate the movable member 36 to the end that the operator may determine the water level in the tube 32 and radiator.

It is obvious that any variation of the water level in tube 32 will result in a movement of the member 33 and the operator may determine at a glance when the water level becomes dangerously low.

I claim:

A water level indicator for radiators, comprising a tank, a pipe establishing communication between the tank and radiator to permit water to pass from the radiator to the tank, a shaft extending into the tank adjacent to the upper end of the tank, a curved arm having one of its ends secured to the shaft, a float of a size to fit within the tank, an eye secured to the float to receive the curved arm, said float adapted to move the arm and shaft with the rise and fall of the liquid level in the tank, and an indicator operated by the shaft.

In testimony that I claim the foregoing as my own, I have hereto affixed my signature.

CLARENCE B. O'NEILL.